Aug. 20, 1968
E. H. WILLETTS
3,397,896
VEHICLE SUSPENSION SYSTEM
Filed April 1, 1965
4 Sheets-Sheet 1
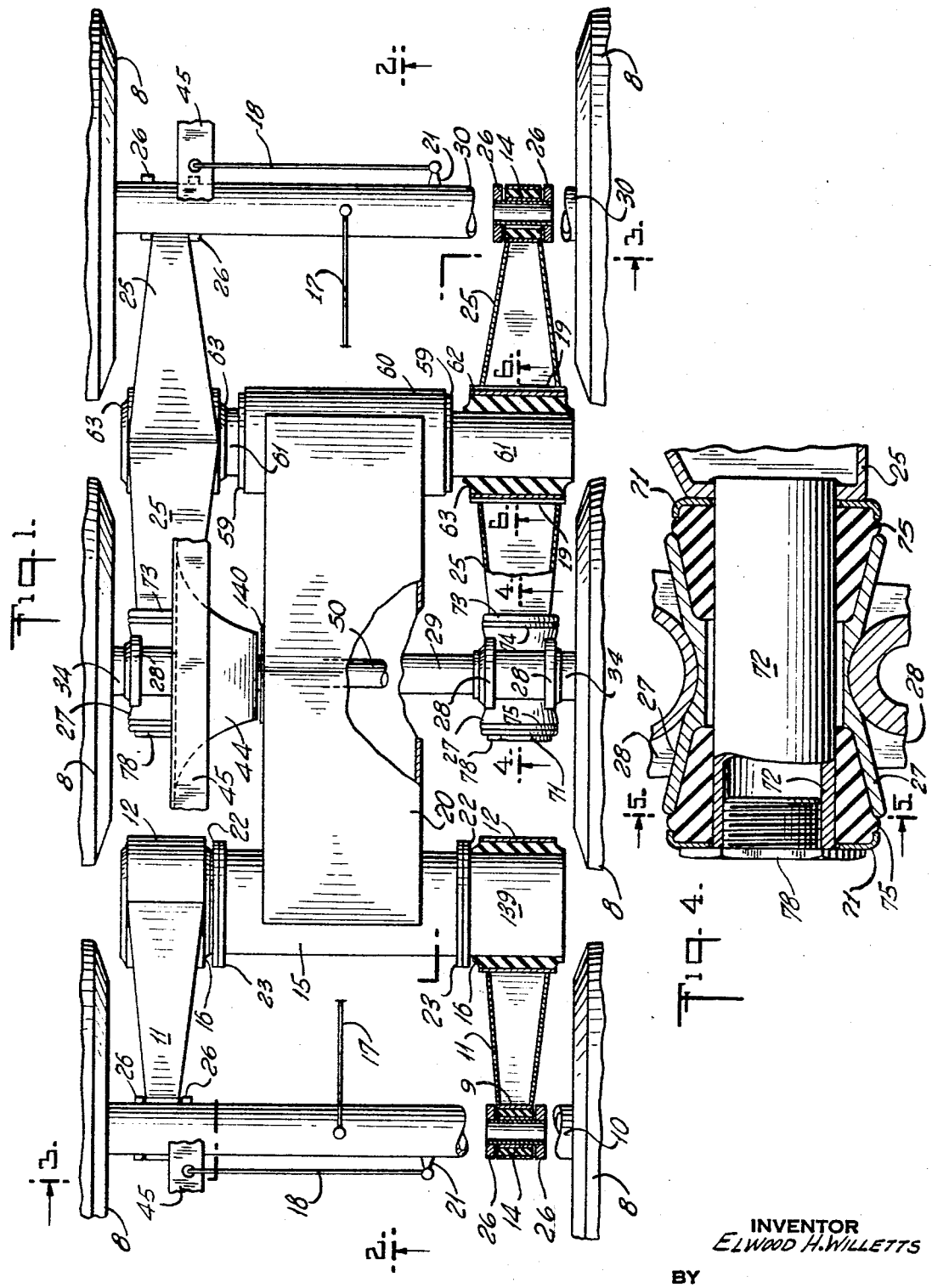
INVENTOR
ELWOOD H. WILLETTS
BY
Nolte & Nolte
ATTORNEYS Aug. 20, 1968  E. H. WILLETTS  3,397,896
VEHICLE SUSPENSION SYSTEM
Filed April 1, 1965  4 Sheets-Sheet 2
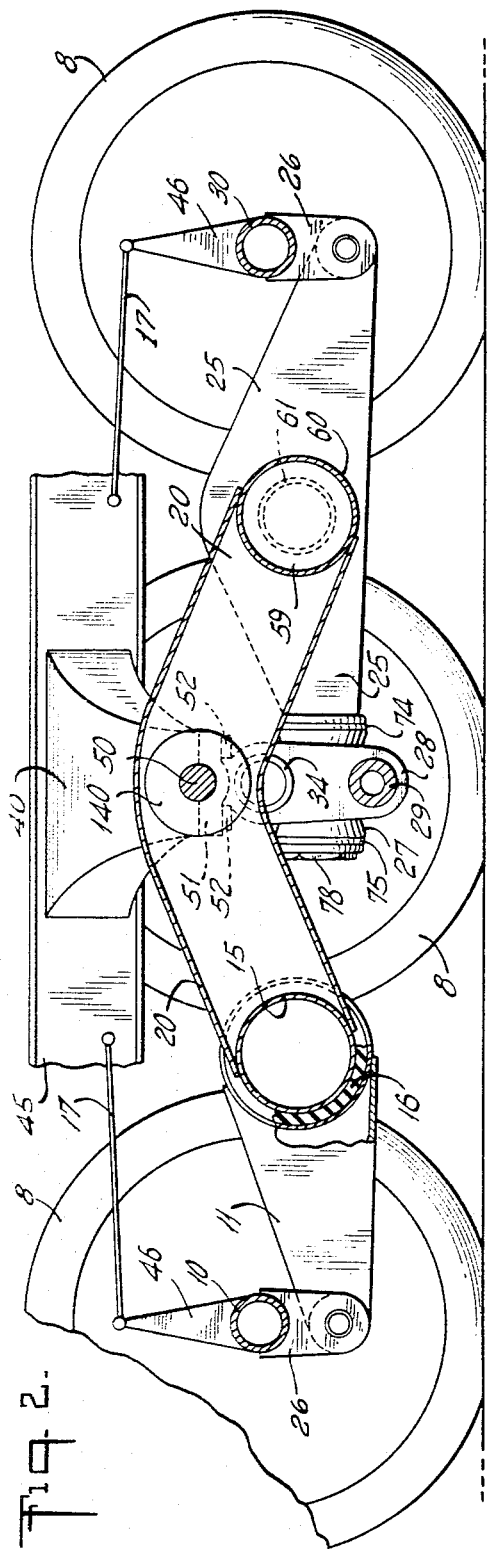
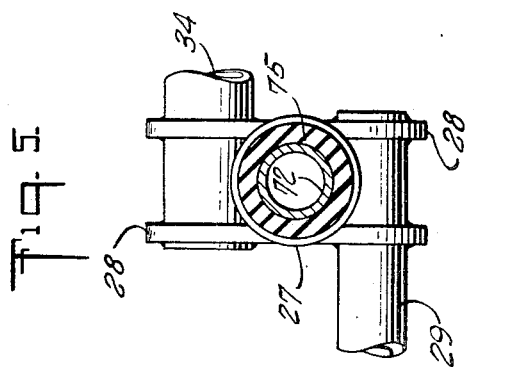
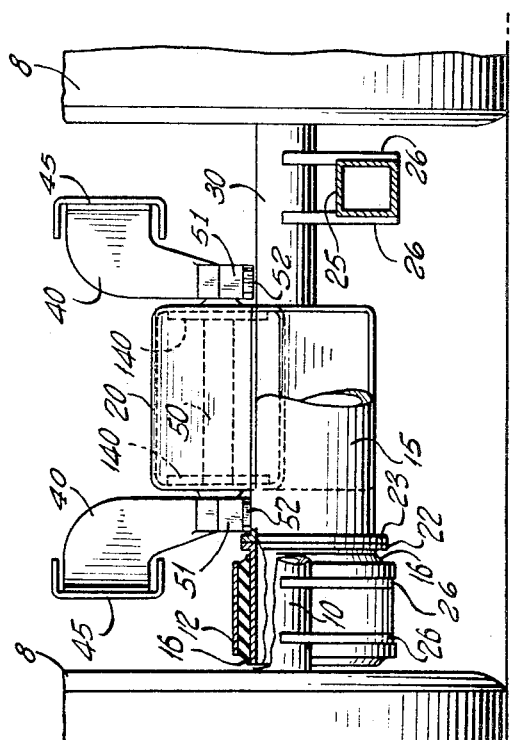
INVENTOR
ELWOOD H. WILLETTS
BY
Nolte & Nolte
ATTORNEYS

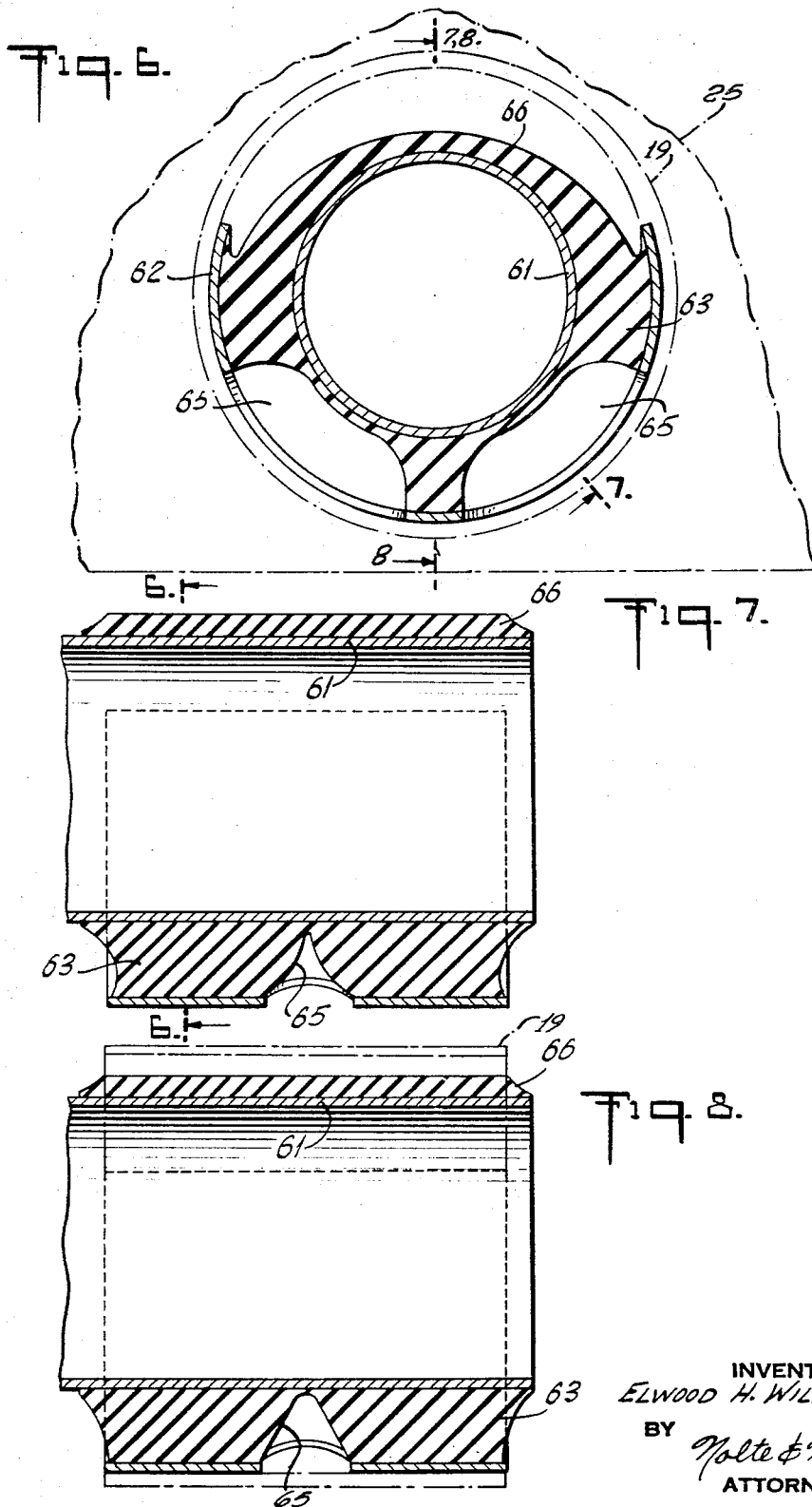

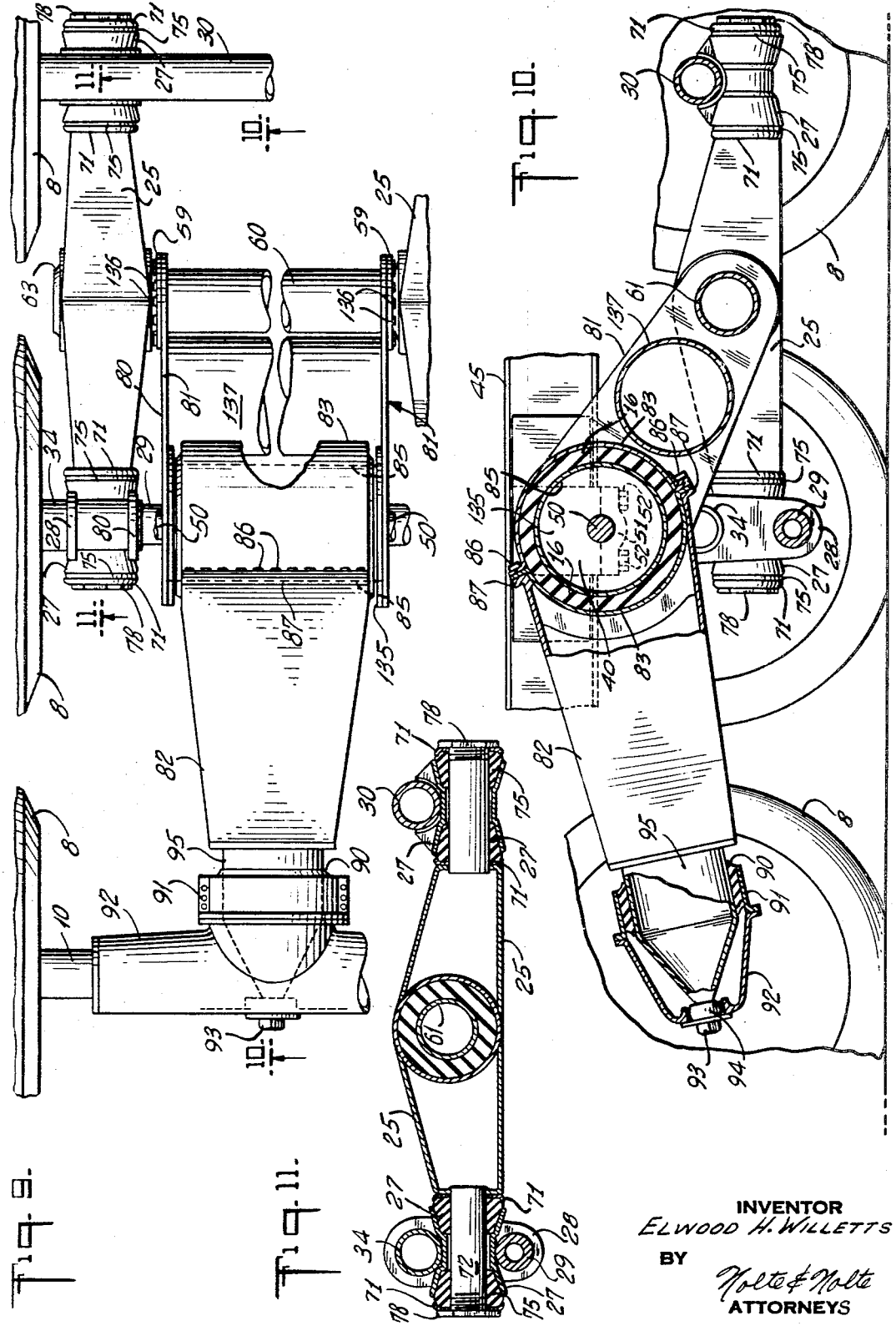

United States Patent Office 3,397,896
Patented Aug. 20, 1968

3,397,896
VEHICLE SUSPENSION SYSTEM
Elwood H. Willetts, 102 S. Penataquit Ave.,
Bay Shore, N.Y. 11706
Filed Apr. 1, 1965, Ser. No. 444,613
8 Claims. (Cl. 280—104.5)

ABSTRACT OF THE DISCLOSURE

The present invention includes a multiple axle suspension for a vehicle including a frame structure, a support shaft journalled in the frame structure, three axles equally supporting the sprung mass, a suspension beam journalled on the support shaft and articulated within its extremities by torque reactive tubular elastomer means stressed in torsional shear for enabling controlled freedom of vertical movement at transversely opposite ends of the first said axles, and equalizer means connected to said suspension beam and supported by second and third of said axles for providing cushioning substantially parallel to the frame structure.

---

This invention relates to multiple axle, toque reactive, articulated suspension beam structures for vehicles which provide an improvement in the softness of ride while preventing transverse roll.

A current problem in known multiple axle suspensions arises from the use of solid hinged beams, bell cranks, or other axle load equalizers to enable verticle oscillation of the individual axles relative to the vehicle. Such metal undamped beam equalizers transmit, and often compound rather than isolate, the surface induced vibrations of one axle with respect to the others. Thus, problems such as wheel hop, unequal brake torque reactions, hard ride, and resonance, are direct results of such designs.

In one form of the invention employing three equally spaced cross axles, a suspension bogie is characterized by an articulated suspension beam extending longitudinally about a support shaft secured to a frame structure, the beam articulated beyond said support shaft toward a first of the axles to which that end of the beam is attached for support of one-third of the load (of the frame structure). Said first axle has restrained freedom of vertical movement at transversely opposite ends thereof in relation to the frame structure. The opposite least disposed end of the articulated suspension beam is bondedly interconnected to the aforementioned end by tubular elastomers stressed in torsional shear and reactive on both said ends of said articulated beam. The later end of said beam terminates in a cross beam having transversely extending spindles on which equalizer bars are journalled with their ends supported on the other two axles of the three axles referred to. These two axles provide parallelism of the frame structure with the mean vertical position of the transversely opposite ends of each of said axles.

The suspension according to my invention is described herein with a multiple of cross axles uniformly disposed longitudinally on which the load is equally distributed in each case, regardless of unevenness of terrain.

This novel construction is applicable to both track and trackless vehicles, whether self-propelled or trailing.

Certain features of disclosures in the inventor's U.S. Patents 2,951,710; 3,013,808 and 3,171,668 to which reference may be had, are utilized in the present invention.

Each form of this novel suspension embodies a tubular elastomer stressed in torsional shear, in a torque reactive articulated suspension beam supported equally by each of the axles of the bogie, and supporting the vehicle structure at a single point on each side of the frame, to improve the isolation of road shocks and axle vibration from the vehicle structure, while preventing the attendant transverse roll characteristic of higher deflection suspensions.

It is the principal object of the present invention to provide a multiple axle, torque-reactive, low frequency load cushioning vehicle wheel suspension which has means for controlling the transverse roll of the vehicle.

It is another object of the present invention to provide multiple axle torque-reactive wheel suspension system having an articulated suspension beam structure connected to the transverse supporting axles to give greater freedom of vertical movement at opposite ends relative to each other than is ordinarily obtained from the presently accepted connecting means between a suspension and its supporting axles.

It is another object of the present invention to provide a multiple axle, torque-reactive wheel suspension connected to the frame structure of a vehicle that has improved freedom of vertical movement of the opposite ends of the forwardly disposed transverse axle while providing the rearwardly disposed axles with cushioning parallel to the frame structure to inhibit transverse roll.

Still further objects of the present invention are to provide multiple axle, torque-reactive wheel suspension structure for vehicles, having the above objects in mind, which is of simple construction, constructed of a minimum number of parts, is easy to assemble, gives maximum cushioning action, is compact, has long life, and is effective and efficient in use.

Other objects and features of the present invention will become apparent from the following detailed drawings, which disclose the embodiments of the present invention. It should be understood, however, that the drawings are designed for purposes of illustration only, and not as a definition of the limits of the invention, as to which reference should be made to the appended claims.

In the drawings, wherein similar reference characters denote similar elements throughout the several views:

FIG. 1 is a top plan view, with parts broken away, showing a preferred form of the present invention;

FIG. 2 is a section taken along the line 2—2 of FIG. 1;

FIG. 3 is a section taken on line 3—3 of FIG. 1;

FIG. 4 is a fragmentary section taken on line 4—4 of FIG. 2;

FIG. 5 is a section taken along line 5—5 of FIG. 1;

FIG. 6 is a fragmentary cross section taken along line 6—6 of FIG. 1;

FIG. 7 is a section taken along line 7—7 of FIG. 6;

FIG. 8 is a cross sectional view of the tubular elastomer of FIG. 6, along line 8—8 of FIG. 6;

FIG. 9 is a fragmentary top plan view of another embodiment of a 3-axle vehicle suspension according to the invention;

FIG. 10 is a section taken on line 10—10 of FIG. 9;

FIG. 11 is a fragmentary section taken along line 11—11 of FIG. 9;

Referring now particularly to FIGS. 1–8, there is shown a three axle wheel suspension bogie according to the invention applicable to vehicles wherein none, one, two, or three axles of the suspension may be driven. The wheel suspension bogie is connected to a vehicle frame comprised of longitudinally extending frame members 45, 45 through depending support brackets 40 (as shown in FIG. 3) in which support shaft 50 is journalled at its ends in bearing caps 51, caps 51 being secured by bolts 52 to support brackets 40. Said support shaft 50 is provided with transversely spaced support shaft flanges 140 which are secured as by welding.

The longitudinally extending articulated suspension beam secured to support shaft 50 comprises a single beam end 20 and the two split beam ends 11. The single beam end 20 terminates at a first cross beam 15 forwardly of said support shaft 50, and at a second cross beam 60 longitudinally opposite said support shaft 50. End flanges 23 on first cross beam 15 secures split beam spindles 139 at their flanges 22 to said first cross beam 15, and tubular elastomers stressed in torsional shear bondedly articulate single beam 20 with split beams 11 in split beam hubs 12. Sleeve collars 9 in the opposite ends of split beams 11 carry rubber bushings 14 to which axle 10 is attached at first axle beam brackets 26.

Assuming that the first axle 10 is a drive axle, it would be equipped with the conventional torque bracket 46 and torque rod 17 attached to frame 45 in order to provide parallelogram motion of the pinion drive shaft of the axle. To relieve undue axial stress on the articulation elastomer 16, the first axle 10 is provided with track bar 18 extending transversely from track bar bracket 21 on said first axle 10 to frame 45. The independent articulated connection of each of the split beams 11 of the articulated suspension beam enables vertical freedom of first axle 10 at transversely opposite ends thereof without undue torsional stress in the single beam end 20 of the suspension beam to which said split beams 11 are bondedly secured. The rearwardly extending single suspension beam 20, aft the cross shaft 50, terminates in a second cross beam 60 having transversely extending spindles 61 secured thereto by spindle flanges 59.

Equalizers 25 are journalled on said spindle 61 by a novel radially deflective elastomer 63 bonded externally of second cross beam spindle 61 and within radial elastomer shell 62 extending approximately 270 degrees radially around said elastomer 63 which is molded with voids axially midlength below the vertical center thereof shown as 65, and further cut back at 66 to reduce relative torsional resistance while increasing radial and axial deflection for the purpose of isolating the sprung mass from road shocks transmitted through tires 8 of axles 30 and 29–34. Said radial elastomer shell 62 together with spindle 61 and elastomer 63, to which both are bonded, is pressed into hubs 19 of equalizers 25, which are supported forwardly on drop axle 29–34 at equalizer spindle 72 which is journalled in a pair of oppositely disposed conical elastomers 75, axially restrained within axle gimbal brackets 27 between cupped washers 71, which cup washers are adjustably secured by bolts 78 threaded into equalizer spindle 72 (FIG. 4).

Gimbal brackets 27 are disposed between a pair of transversely disposed flanges 28 made integral therewith, and which flanges also serve to unite the drop axle center 29 with its transversely extending drop axle spindles 34 into an integrally welded single piece drop axle 29–34. Equalizers 25, disposed rearwardly of spindle 61, terminate in bushing sleeve 9 into which a standard rubber bushing 14 is pressed for connection to third axle 30 at axle arm bracket 26 of the drive axle, in much the same manner as for first axle 10. Axle 30, if a drive axle, is provided with torque rod bracket 46 and torque rod 17 extending to frame 45 in the same manner as for first axle 10. Thus drive and/or brake torque reactions of axles 10 and 30 are directly transferred to frame 45 through torque rods 17, while the brake torque reactions of drop axle 29–34 are cushionedly transferred to the conical elastomer 75 and to equalizer spindles 72 of equalizers 25. Thence, the brake torque reactions of drop axle 29–34 are transferred through said equalizers 25 to axle arm brackets 26 of axle 30. Since the reaction is vertical, it will be directed upwardly with movement to the left of FIG. 1, and will be downwardly with a reverse movement. Drop axle 29–34 may be chain or belt driven from second axle 30. Where third axle 30 is a dead or trailing axle, the equalizer 25 will be as shown in FIG. 10.

Third axle 30 is positioned transversely relative to frame 45 of the spring mass structure through track bar bracket 21, and track bar 18 to frame 45, and similarly to the same positioning of first axle 10. Drop axle 29–34 is free of fixed transverse positioning except for the resilient axial resistance of radial elastomer 63 at the pivotal center of equalizers 25, which are fixed transversely at axle arm brackets 26 of axle 30. Thus drop axle 29–34 enjoys transverse freedom to allow the arc of a curve on which axles 10 and 30 are fixed by track bars 18 to thus reduce tire scuffing on all tires of the three axles 10, 29–34 and 30 and to reduce tractive effort required to pull a vehicle.

As described previously, each of the side equalizers 25 is shown connected to the transverse ends of second cross beam 60 at the rearward termination of single beam 20 by a radially deflective tubular elastomer 63 (as shown in FIGS. 6–8) having a part of its upper section 66 molded free of contact with the inner circumference of tube 62 to reduce its torsional resistance without appreciably effecting its required radial load capacity. Tubular elastomers 63 are further molded with arcuately extending voids 65 midlength and below the center of the elastomer to increase its radial and axial deflection out of proportion with its required area of bond on shaft. (FIGS. 7 and 8.) This novel design of tubular elastomer 63 thus provides for the desired radial load capacity while effecting an increased radial deflection both vertically and horizontally, to cushion road surface impact with reduced torsional, angular and axial resistance. This resistance is below that of previous elastomers of a given radial load capacity, and enables the diagonal biasing of the opposite ends of the intermediate and rear axles. It is to be understood that where restricted radial, axial, and angular alignment is required, that any commercial low friction bearing may be optionally substituted for tubular elastomer 63.

Each end of either of the three axles may be deflected vertically and independently of its opposite ends. Transverse vertical alignment of the sprung mass will be parallel to the average deflection of the four ends of the drop axle 29–34 and the third axle 30.

In this embodiment of the suspension according to the invention, beam leverage is substituted in lieu of providing a greater torsional resistance in the articulation elastomer 16 by locating it closer to the first axle, rather than at the support shaft 50 on which the single beam 20 is journaled to the vehicle structure 45. Where the axis of the articulation elastomer is other than where the beam is journalled to the frame strucure, beam leverage is substituted for the otherwise greater torsional resistance required for the articulation elastomer.

Another embodiment of the invention employing three axles is shown in FIGS. 9–11 whereby the suspension beam is also articulated, in this case the articulation elastomer 15 is disposed concentrically about the pivotal axis 50 on which the sprung mass is supported, with the forwardly extending long beam 82 of the articulated suspension beam 81–82, terminating in a centrally disposed spindle 95, about which a first axle 10 provided with an integral load bearing center 92 is journalled on ball bushing 94. Bonded tubular elastomer 90 is stressed in torsional shear to enable controlled freedom of vertical movement of transversely opposite ends at first axle 10.

Elastomer 90 bondedly interconnects spindle nose 95 and elastomer cover 91, which is detachably secured to said axle center 92. Ball bushing 94 is retained by bolt 93 in the extreme end of spindle nose 95. Said articulated suspension beam 81–82 is articulated at support shaft 50 where tubular elastomer 15 is stressed in torsional shear and is disposed concentrically about support shaft 50. Shaft 50 is supported in support shaft bearing 51 to brackets 40, secured to frame 45. Transversely disposed radially extending flanges 135 are welded to support shaft 50, and support hub 85. The short beam 81 is secured to said hub by side flanges 80 extending longitudinally to and welded integrally with second cross beam 60. Tubular stiffener 137 interconnects said flanges 80 to reduce the slenderness ratio of said short beam 81.

Elastomer 16 is bonded outwardly of hub 85 and within the split flange to cap 83, which is bolted at flanges 87 of long beam 82 by bolts 86. As hub 85 is secured to short beam 81, and the split flange cap is secured, as noted, to long beam 82, the tubular elastomers stressed in torsional shear and interconnecting the long beam 82 and short beam 81 comprising the articulated suspension beam 81–82 is reactive on both said beam ends.

The distance from the longitudinal center of said first axle 10 to the center of support shaft 50 is twice the distance from said support shaft 50 to the center of said second cross beam 60 on which transversely extending beam spindle 61 and the equalizers 25 are journalled to carry two-thirds of the weight of the frame structure to axles 30 and 29–34, as in the construction portrayed in FIGS. 1 and 3 of an otherwise different form of the invention.

The intermediate axle, FIG. 10, similar to the corresponding axle of the embodiment of FIG. 1, is provided with a dropped center section 29 to enable it to reflect vertically beneath the superimposed elastomer 88 contained within the torque reactive articulated suspension beam.

Either of the first two embodiments of the three axle suspension discussed may be converted for unladen trips to either a two axle suspension or a single axle suspension without increasing the spring rate of the vehicle. Either the intermediate or the rear axle may be hoisted from ground contact and tied to the vehicle frame to temporarily provide a tandem axle suspension for partial loading without sacrificing any of the qualities of the suspension. Moreover for a single axle suspension, the front and intermediate axles, or the front and rear axles may be tied to the vehicle frame without sacrificing the low spring rate of the vehicle's suspension.

In each of the embodiment of the novel suspension system according to the invention, it is feasible to convert the suspension to a single axle suspension for unladen trips by hoisting the forward axle and tieing it to the vehicle structure without increasing the spring rate of the suspension or its ability to resist transverse roll.

While only a few embodiment of the present invention have been shown and described it will be understood that many changes and modifications may be made therein without departing from the spirit and scope of the invention, as defined by the appended claims. While the invention has been described with reference to forward and rear axles, it is conceivable that many of the inherent advantages of the suspension system will be preserved if the direction of travel of the suspension systems were to be reversed so as to invert the functions of the forward and rear axles. It is also conceivable that some of the features of one or more embodiments may be substituted or added to the features of the other suspensions to likewise provide a multiaxle suspension having an improved softness of ride and resisting the tendency of the vehicle toward transverse roll.

I claim:

1. In a multiple axle suspension for a vehicle, the combination, comprising a frame structure having a longitudinal axis; a support shaft journalled in said frame structure; a plurality of axles spaced beneath said support shaft and extending substantially perpendicularly with respect to said axis, the weight of the sprung mass being substantially equally distributed over said axles; a longitudinally extending articulated suspension beam journalled on said support shaft and including a first and a second portion, said first portion including a longitudinally extending center member having a forward end and a longitudinally opposite rearward end, a first cross member having forward spindles extending transversely with respect to said center member, said first cross member being integral with the forward end of said center member, a second cross member having rearward spindles extending transversely with respect to said center member, said second cross member being integral with the rearward end of said center member, said second portion including a pair of spaced split beam members each extending longitudinally with respect to said frame structure to and being supported by a first of said axles; torque reactive tubular elastomer means stressed in torsional shear and bondedly interconnecting each of said split beam members with one of said forward spindles equidistant said first and a second of said axles for enabling controlled freedom of vertical movement at transversely opposite ends of said first axle; and equalizers spaced transversely with respect to each other and trunnioned on each of said rearward spindles, the ends of said equalizers being supported by said second and a third of said axles thereby providing cushioning substantially parallel to said frame structure.

2. A multiple axle suspension according to claim 1, wherein said plurality of axles comprise three axles equally spaced transversely beneath said support shaft.

3. In a multiple axle suspension for a vehicle, the combination, comprising a frame structure having a longitudinal axis; a support shaft journalled in said frame structure; a plurality of axle means spaced beneath said support shaft and extending substantially perpendicularly with respect to said axis; a longitudinally extending articulated suspension beam journalled on said support shaft, a portion of said beam including a longitudinally extending center member having a forward end and a longitudinally opposite rearward end, the rearward end of said center member terminating in transversely extending spindles; torque reactive elastomer means stressed in torsional shear for enabling controlled freedom of vertical movement at transversely opposite ends of a first of said axle means, said elastomer means interconnecting a portion of said suspension beam and said first axle means; and equalizers spaced transversely with respect to each other and trunnioned on each of said rearward spindles, the ends of said equalizers being supported by said second and a third of said axle means thereby providing cushioning substantially parallel to said frame structure.

4. In a multiple axle suspension for a vehicle, the combination, comprising a frame structure having a longitudinal axis, a support shaft journalled in said frame structure, a plurality of axles extending transversely with respect to said longitudinal axis of said frame structure, an articulated suspension beam journalled on said support shaft and extending longitudinally with respect to said longitudinal axis to a first of said axles, said suspension beam including a first portion and a second portion, said first portion including forward and rearward spindles extending transversely with respect to said longitudinal axis, said second portion including a plurality of spaced members each extending longitudinally with respect to said frame structure to and being supported by a first of said axles, torque reactive elastomer means stressed in torsional shear and bondedly interconnecting each of said spaced members with one of said forward spindles, and longitudinally extending equalizer means trunnioned on each of said rearward spindles for providing cushioning substantially parallel to said frame structure, ends of said equalizer means supported respectively by respective ones of said axles.

5. In a multiple axle suspension for a vehicle, the combination, comprising a frame structure having a longitudinal axis; a support shaft journalled in said frame structure; a plurality of axles spaced beneath said support shaft and extending substantially perpendicularly with respect to said axis, the weight of the sprung mass being substantially equally distributed over said axles; a longitudinally extending articulated suspension bean journalled on said support shaft and including a first and a second portion, said first portion including a longitudinallly extending center member having a forward end and a longitudinally opposite rearward end, a first cross member having forward spindles extending transversely with respect to said center member, said first cross member being integral with the forward end of said center member, a second cross member having rearward spindles extending transversely with respect to said center member, said second cross member being integral with the rearward end of said center member, said second portion including a pair of spaced split beam members each extending longitudinally with respect to said frame structure to and being supported by a first of said axles; torque reactive tubular elastomer means stressed in torsional shear and bondedly interconnecting said split beam members and said forward spindles equidistant said first and a second of said axles for enabling controlled freedom of vertical movement at transversely opposite ends of said first axle; and equalizers spaced transversely with respect to each other and journaled on each of said rearward spindles, said equilizers being bondedly interconnected with said rearward spindles by second tubular elastomers having cavities formed therein, said cavities disposed above and below a centermost point in said elastomers, said lower cavities disposed on either side of a vertical axis of symmetry of said elastomer such that radial, axial and torsional deflections of said elastomers are increased with respect to an area of contact between the spindles and the elastomers, the ends of said equalizers being supported by said second and a third of said axles thereby providing cushioning substantially parallel to said frame structure.

6. A multiple axle suspension according to claim 5 wherein said second elastomers are formed with said lower cavities disposed axially midlength below said centermost point.

7. A multiple axle suspension according to claim 5 wherein said equalizers each include an equalizer hub, said second tubular elastomers being in a compressed state within portions of said hubs.

8. In a multiple axle suspension for a vehicle, the combination, comprising a frame structure having a longitudinal axis; a support shaft journalled in said frame structure; a plurality of axles spaced beneath said support shaft and extending substantially perpendicularly with respect to said axis, the weight of the sprung mass being substantially equally distributed over said axles; a longitudinally extending articulated suspension beam journalled on said support shaft and including a first portion and a second portion, said first portion including a longitudinally extending center member having a forward end, a nose portion integral with said forward end, said beam including a second portion having a rearward end having rearward spindles extending substantially transversely with respect to said longitudinal axis, a first axle center member extending substantially transversely with respect to said longitudinal axis and supported by a first of said axles; first torque reactive tubular elastomer means stressed in torsional shear and bondedly interconnecting said first axle center member and said nose portion for enabling controlled freedom of vertical movement at transversely opposite ends of said first axle; second torque reactive elastomer means stressed in torsional shear and bondedly interconnecting said first and said second portions; and equalizers spaced transversely with respect to each other and trunnioned on each of said rearward spindles, the ends of said equalizers being supported by a second and a third of said axles thereby providing cushioning substantially parallel to said frame structure.

References Cited

UNITED STATES PATENTS

| | | | |
|---|---|---|---|
| 2,051,864 | 8/1936 | Knox | 280—104.5 X |
| 2,446,205 | 8/1948 | Wickersham | 280—104.5 X |

PHILIP GOODMAN, *Primary Examiner.*